(12) United States Patent
Boezen

(10) Patent No.: US 9,204,512 B2
(45) Date of Patent: Dec. 1, 2015

(54) LED CURRENT CONTROL

(71) Applicant: NXP B.V., Eindhoven (NL)

(72) Inventor: Hendrik Boezen, Nijmegen (NL)

(73) Assignee: NXP B.V., Eindhoven (NL)

( * ) Notice: Subject to any disclaimer, the term of this patent is extended or adjusted under 35 U.S.C. 154(b) by 282 days.

(21) Appl. No.: 14/073,541

(22) Filed: Nov. 6, 2013

(65) Prior Publication Data

US 2014/0159598 A1 Jun. 12, 2014

(30) Foreign Application Priority Data

Dec. 7, 2012 (EP) ..................................... 12196127

(51) Int. Cl.
*H05B 37/02* (2006.01)
*H05B 33/08* (2006.01)

(52) U.S. Cl.
CPC .......... *H05B 33/0848* (2013.01); *H05B 33/083* (2013.01); *H05B 33/0815* (2013.01); *H05B 33/0818* (2013.01); *H05B 33/0851* (2013.01); *Y02B 20/347* (2013.01)

(58) Field of Classification Search
CPC . H05B 33/0833; H05B 33/0842; H05B 37/02
USPC .................. 315/291, 294, 297, 301, 307–308
See application file for complete search history.

(56) References Cited

U.S. PATENT DOCUMENTS

| | | | |
|---|---|---|---|
| 7,511,436 B2 | 3/2009 | Xu | |
| 8,723,441 B2 | 5/2014 | Hoogzaad | |
| 2006/0267514 A1* | 11/2006 | Xu | H05B 33/0815 315/291 |
| 2007/0262724 A1* | 11/2007 | Mednik | H05B 33/0818 315/125 |
| 2012/0098423 A1 | 4/2012 | Esaki et al. | |
| 2012/0098453 A1 | 4/2012 | Esaki et al. | |
| 2013/0229121 A1* | 9/2013 | Otake | H05B 33/0845 315/200 R |

FOREIGN PATENT DOCUMENTS

| | | |
|---|---|---|
| CN | 1784930 A | 6/2006 |
| CN | 102037783 A | 4/2011 |
| CN | 102573207 A | 7/2012 |
| WO | 2004/100614 A1 | 11/2004 |
| WO | 2009/095865 A2 | 8/2009 |
| WO | WO 2009095865 A2 * | 8/2009 ......... H05B 33/0818 |

OTHER PUBLICATIONS

Extended European Search Report for EP Patent Appln. No. 12196127.0 (Jun. 11, 2013).

* cited by examiner

*Primary Examiner* — Tuyet Vo
*Assistant Examiner* — Henry Luong

(57) ABSTRACT

An LED control circuit for controlling a current supplied to an LED unit is disclosed. A sense resistor is included for sensing an output current provided from an output node. A comparator circuit is provided for detecting upper and lower thresholds in the output current based on the voltages at ends of the sense resistor, and for controlling a current supply to maintain the current between the thresholds. The comparator circuit comprises a reference current source and reference resistors, for generating upper and lower threshold references. The comparator circuit further comprises a comparator for detecting a mid-range voltage dependent on the output current and deriving a control signal which indicates if the detected voltage is above or below the mid-range voltage. The control signal is used to adjust the reference current source, thereby to vary the upper and lower threshold references to maintain a constant median or average output current.

15 Claims, 4 Drawing Sheets

LED CURRENT CONTROL

CROSS-REFERENCE TO RELATED APPLICATIONS

This application claims the priority under 35 U.S.C. §119 of European patent application no. 12196127.0, filed on Dec. 7, 2012, the contents of which are incorporated by reference herein.

This invention relates to the control of LED currents, in particular for a string of LEDs connected in series. In particular, the invention relates to a dimming function applied to LEDs within the string of LEDs.

Strings of LEDs are used to form a so called matrix beam LED, for example as used in vehicle headlights. The dimming function is used to implement a beam steering function.

It is known that within a string of LEDs, dimming can be achieved by individually dimming selected LEDs or groups of LEDs. One approach is to provide a shorting transistor in parallel with one or more of the LEDs in the string. When the shorting transistor is turned on, the associated LED is bypassed and is thus turned off. The shorting signal can take the form of a pulse width modulation (PWM) signal so that fine dimming control can be implemented.

The string of LEDs is driven by a constant current drive circuit. To implement the constant current drive, a feedback mechanism is used, which is based on the voltage across a current sense resistor. This feedback mechanism for example controls the current through an inductor to ramp the current supply between upper and lower boundaries, thereby maintaining the current near a desired level.

A problem with the use of dimming based on shorting LEDs within the string is that the total string voltage changes (for the given constant current). This voltage change can influence the correct operation of the current control circuit, and result in an influence on the average LED current through the string, which is undesired.

In particular, this average current change is caused by delays in the comparator hysteresis and gate driver of the constant current control circuit.

According to the invention, there is provided an apparatus and method as defined in the claims.

In one aspect, the invention provides an LED control circuit for controlling a current supplied to an LED unit, the control circuit comprising:
a sense resistor for sensing an output current provided from an output node; and
a comparator circuit for detecting upper and lower thresholds in the output current based on the voltages at each end of the sense resistor, and for controlling a current supply to maintain the current between the thresholds, wherein the comparator circuit comprises a reference current source and reference resistors, for generating upper and lower threshold references,
wherein the comparator circuit further comprises a comparator for detecting a mid-range voltage dependent on the output current and deriving a control signal which indicates if the detected voltage is above or below the mid-range voltage,
and wherein the control signal is used to adjust the reference current source, thereby to vary the upper and lower threshold references to maintain a constant median or average output current.

This circuit controls the current in known way, by ramping the current between upper and lower thresholds, as detected based on voltage measurement at the ends of a sense resistor. An additional comparator detects a mid-range voltage. This mid-range voltage is for example between the voltages corresponding to the upper and lower thresholds. This mid-range voltage is not used by the current supply control circuit (i.e. a gate driver), so that the delay problems do not apply to the measured signal. If the turn on and turn off delay times of the mid-range comparator are equal, they have no effect on the output (which can be a duty cycle measurement).

The control signal is used to enable control of the desired average (or median) current. For example, the relationship between the time period during which the voltage is higher than the mid-range value and the time period during which the voltage is lower than the mid-range value can be used to provide control of the average (or median) current.

In one example, the mid-range voltage comprises the voltage across the sense resistor (so that the same sense resistor is used), and it corresponds to a desired average or median output current. For a sawtooth current waveform, this means that the time during which the voltage is above the mid-range value should be the same as the time during which the voltage is below the mid-range value.

As a result, the circuit can comprise a duty cycle circuit for determining the duty cycle of the control signal. The comparator circuit can then comprise means for adjusting the reference current to maintain the duty cycle at 50%.

The invention is thus based on a hysteretic converter having an upper and lower comparator levels using two comparators. In the preferred example a third comparator is added that has a trip voltage that corresponds to the desired average current and this comparator indicates if the momentary sense resistor voltage (which is indicative of the LED current) is above or below the target average current.

If the average current is exactly correct, the duty cycle of the comparator will be exactly 50%. If the LED current is too high, the duty cycle will be higher than 50%.

The circuit preferably comprises an inductor in series with the sense resistor to the output node.

The duty cycle circuit can comprise:
a reference clock;
a first counter for counting the number of clock cycles during a predetermined number of periods of the control signal;
a second counter for counting the number of clock cycles during the high phases with the predetermined number of periods of the control signal; and
a comparator for comparing the counter outputs to derive duty cycle information.

In this way, the (third) comparator output can be used as the count enable signal for a counter which is driven by a (fast) on-chip clock. The same clock also drives another counter.

After some time, the ratio of the count values holds a digital representation of the duty cycle, with an arbitrarily high resolution depending on the measurement time. This digital signal can then be used in a control loop to make a small adjustment to the upper and lower comparator thresholds, by varying the reference current, to regulate the duty cycle to exactly 50%. When that condition is reached, the errors caused by the comparator delay and gate driver delay are cancelled.

It is noted that the control loop regulates the median and not the average current, but in the case of a sawtooth current waveform, this is the same.

The duty cycle circuit can comprise a divider for dividing the control signal to derive a count window corresponding in length to a multiple of the period of the control signal.

The invention also provides an LED circuit comprising:
an LED control circuit of the invention; and
a string of series-connected LEDs provided at the control circuit output.

The string of LEDs can comprise at least one bypass switch in parallel with a sub-set of one more LEDs of the strings, thereby to provide controllable dimming of the sub-set of LEDs. It is this bypass switching which causes the undesired voltage changes which can influence the current feedback control.

The invention also provides a method of controlling the current supplied to an LED unit, the method comprising:

sensing an output current provided to the LED unit;

detecting upper and lower thresholds in the output current by comparing the voltages at each end of a sense resistor with upper and lower threshold references which are generated using a reference current;

controlling a current supply to maintain the current between the thresholds, wherein the method further comprises:

detecting a mid-range voltage dependent on the output current and deriving a control signal which indicates if the detected voltage is above or below the mid-range voltage; and adjusting the reference current source to vary the upper and lower threshold references to maintain a constant median or average output current.

A calibration function can be derived from the reference current source adjustments, such that the calibration function determines a required relationship between the control signal and the required reference current source setting. In this way, after the system has stabilised by making the required current source adjustments in response to the control signal, the system can learn the required current source settings for future use, thereby enabling delay-free regulation.

An example of the invention will now be described with reference to the accompanying drawings, in which.

The invention provides an LED control circuit for controlling a current supplied to an LED unit using a comparator circuit for detecting upper and lower thresholds in the output current based on the voltages at each end of a sense resistor. The current is maintained between the thresholds. For this purpose a reference current source is used for generating upper and lower threshold references. A comparator is used for detecting a mid-range voltage (e.g. based on desired average current) and the reference current source is controlled using this comparator signal thereby to vary the upper and lower threshold references to maintain a constant median or average output current.

Figure 1:
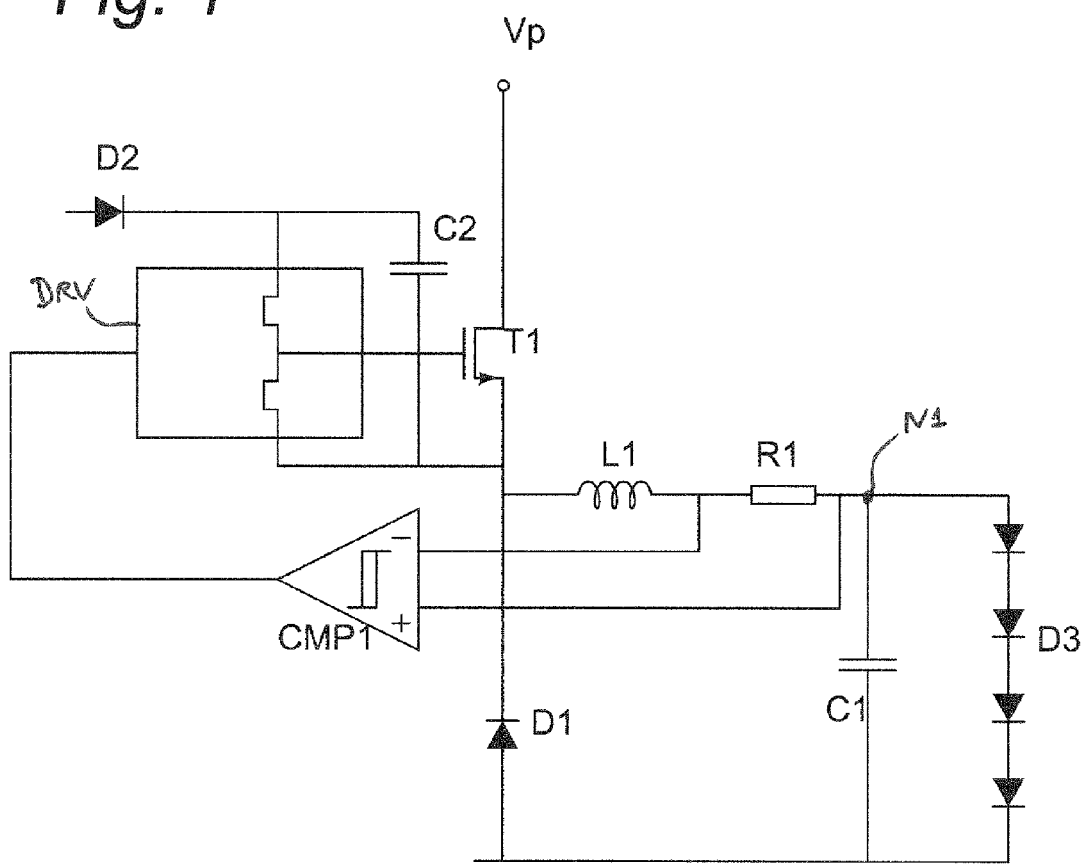
FIG. 1 shows a known Buck LED driver with hysteretic control.

FIG. 1 shows a conventional hysteretic buck converter for constant current LED drive.

The LED string D3 should be driven with a constant average current. The current is maintained by selectively switching an inductor L1 to the positive power rail Vp. The inductor and voltage source can together be considered to be a current supply. The switching is by means of a transistor T1 (a FET) which is in series between the power rail Vp, the inductor L1 and the LED string D3.

The switching is controlled by a comparator CMP1 which has an upper and lower switching threshold. The inductor current flows through a current sense resistor R1 also in series with the LED string D3. The voltages at the two resistor terminals are provided to the comparator CMP1.

The output of the comparator CMP1 drives the transistor T1 (through a gate driver DRV).

The comparator CMP1 detects upper and lower thresholds for the value of the current flowing through the sense resistor R1 and therefore through the inductor L1 and LED string D3.

As soon as the inductor current drops below the lower threshold, the transistor T1 is switched on. This causes the inductor current to increase, until the upper threshold is reached. Then the transistor T1 is switched off, and the inductor current continues to flow through diode D1 which is coupled between the low power rail and the inductor terminal. A smoothing capacitor C1 is shown across the output.

The current then decreases until the lower threshold is reached again.

Figure 2:
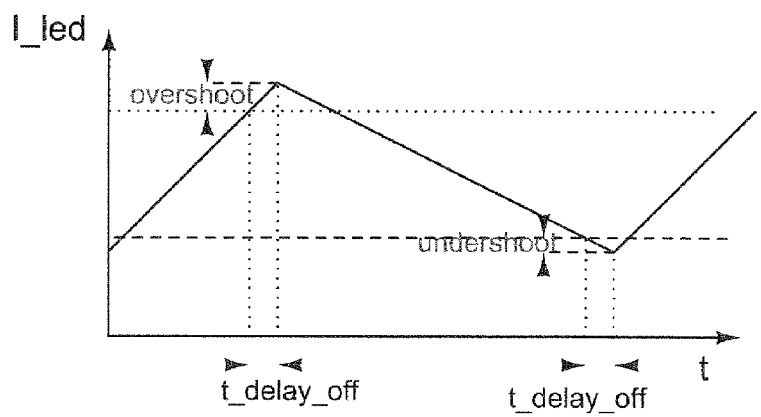
FIG. 2 shows the inductor current and overshoot due to comparator delay for the circuit of FIG. 1.

In this way, the inductor current ramps between the upper and lower threshold. This is shown in FIG. 2.

Because both the comparator CMP1 and the gate driver DRV have a delay, the current will overshoot past the upper threshold, and undershoot below the lower threshold. Even if the turn on and turn off delays are the same, the rate of change of current for the rising and falling edges are generally not the same, and this results in a shift of the average current, depending on the output voltage at node N1 in FIG. 1.

Capacitor C2 is a so-called bootstrap capacitor. Vp is generally the highest supply voltage available. When the transistor T1 is switched on (to let the inductor current increase) the voltage on the gate must be higher than the voltage on the source to turn it on. Typically, when T1 is switched on, Vp on the drain is for example 50 V which is then the same as the voltage on the source. The gate voltage then must be for example be 5 V higher than the source voltage. To drive the gate with the driver DRV a floating (5V) supply is needed referenced to the source. Capacitor C2 provides this floating supply.

Diode D2 is a so-called bootstrap diode and is used to recharge capacitor C2 to compensate for the charge C2 loses to the gate of the transistor T1 when T1 is switched on. The anode of D2 is for example connected to a 5V or 6V supply referenced to ground.

Figure 3:
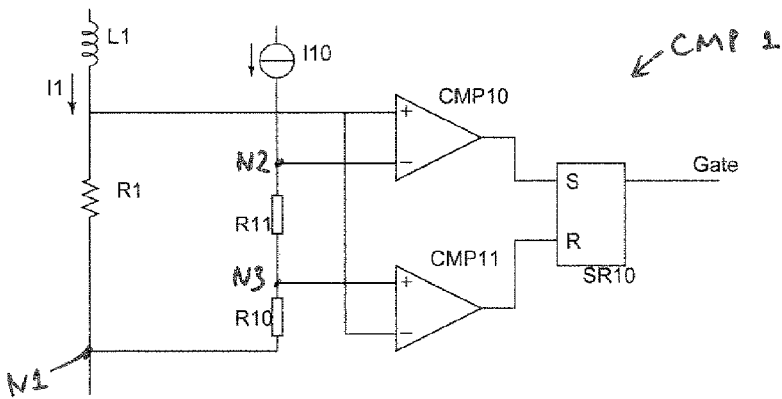
FIG. 3 shows a known hysteretic LED current controller with comparators.

A typical implementation of the hysteretic comparator CMP1 is shown in FIG. 3. As in FIG. 1, L1 is the inductor and R1 is the sense resistor.

The circuit comprises two comparators CMP10 and CMP11. A reference current I10 is generated, and passes through two series resistors R10 and R11 to define reference voltages at nodes N2 and N3. These are upper and lower threshold references.

Comparator CMP10 detects the upper threshold by comparing the voltage at the higher voltage end of the sense resistor R1 with the higher threshold at node N2. The CMP11 detects the lower threshold by comparing the voltage at the lower voltage end of the sense resistor R1 with the lower threshold at node N3.

The hysteresis is made by the Set-Reset latch SR10 which generates the gate drive voltage.

Figure 4:
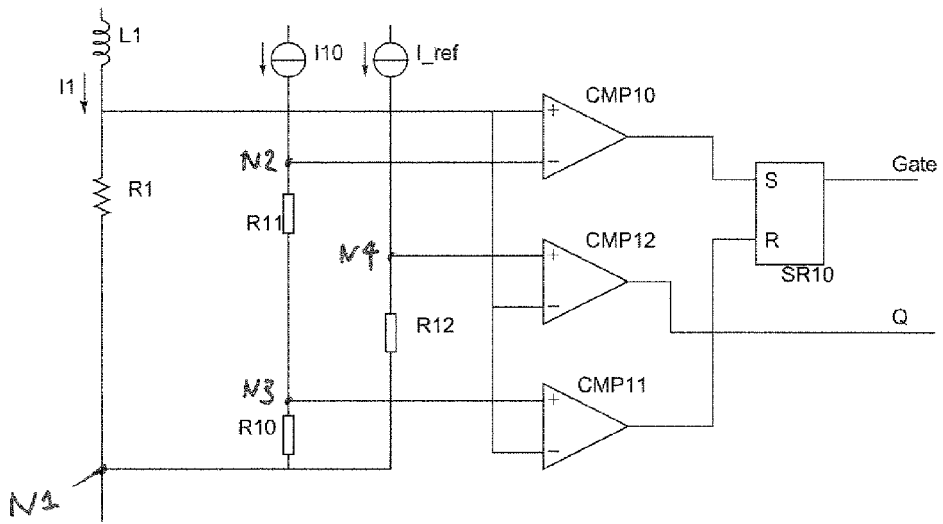
FIG. 4 shows an example of hysteretic converter according to the invention.

FIG. 4 shows an example of hysteretic converter of the invention.

The circuit has the same reference current source I10 and the series resistor chain R10, R11, as well as the two comparators CMP10, CMP11 for detecting the upper and lower threshold values.

A third comparator CMP12 is added that compares the voltage across the sense resistor R1 to a voltage created by a reference current I_ref and resistor R12. This resistor connects to the lower voltage side of the sense resistor R1.

As shown, the negative input of the comparator CMP12 is connected to the high voltage side of the sense resistor R1. The positive input of the comparator at node N4 is connected to the voltage generated at the resistor R12, which is a fixed value greater than the voltage on the lower voltage side of the sense resistor R1 (the voltage at the comparator is $V_{N1}$+ I_ref*R12 where $V_{N1}$ is the voltage at node N1).

The hysteretic switching is the same as in FIG. 3, since the outputs of the two comparators CMP10 and CMP11 control the set-reset latch SR10 which generates the gate drive signal.

The circuit has an additional output Q generated by the comparator CMP12. The output Q indicates if the instantaneous voltage across the sense resistor is higher or lower than the reference value (of I_ref*R12).

Figure 5:
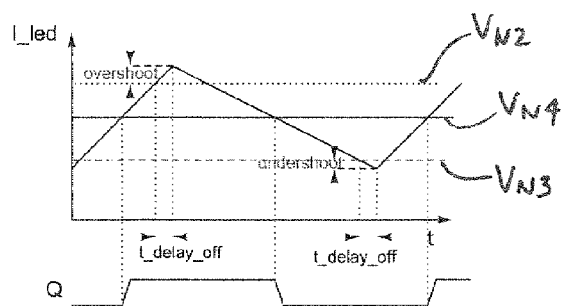
FIG. 5 shows the inductor current and median comparator output for the circuit of FIG. 4.

This is shown in FIG. 5.

The top plots are identical to FIG. 2. $V_{N4}$ is the voltage at node N4 determined by the reference current I_ref. The signal Q toggles between high and low values based on the reference voltage being crossed in response to the ramping current through the LED string.

By setting I_ref*R12 as the desired median current value, the duty cycle of the Q signal is an indication of the deviation of the median of the actual current from the desired reference value.

The invention makes use of this signal to control the current. In particular, the value of the reference current I10 which determines the upper and lower trip levels can be controlled in such a way to reach exactly 50% duty cycle at signal Q.

Because the current waveform has a sawtooth shape, the average current is equal to the median current.

Figure 6:
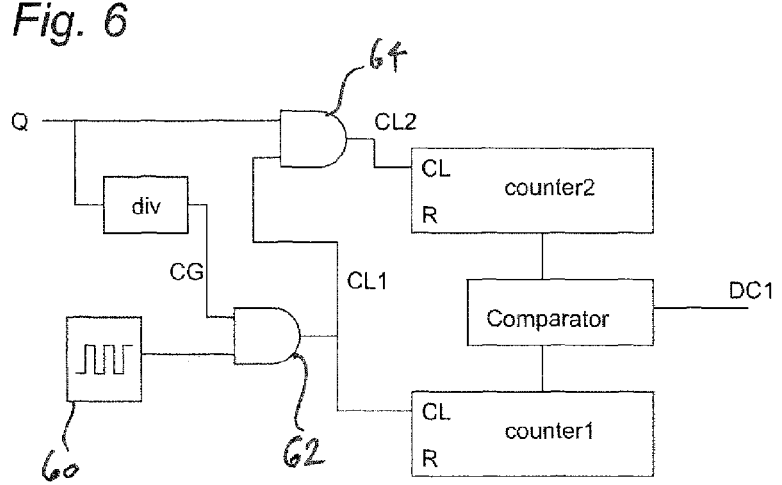
FIG. 6 shows counters to measure the duty cycle of the median comparator.

FIG. 6 shows an example of circuit that can be used to determine the duty cycle of signal Q.

The median detector circuit consists of two counters ("counter1" and "counter2") and a divider ("div"). The divider div counts a fixed number of cycles of signal Q. The signal CG generated by the divider indicates that the counters should be counting. The signal CG functions as an enable signal which allows a clock signal from a clock generator 60 to pass to counter1 by means of an AND gate 62.

For this example, the number of cycles will be taken to be 2.

A first signal CL1 drives counter1. Counter1 counts the total clock pulses when CG is high. At the same time, counter2 counts the same clock, but only when the input signal Q is high. For this purpose, a second AND gate 64 passes the signal CL1 to counter2 only when the input signal Q is high. The output of the second AND gate 64 is the control signal CL2.

When the counting window CG is finished, counter1 will have counted an amount proportional to the time when CG is high, while counter2 will have counted an amount which is proportional to the total time Q and CG were high. Therefore, the ratio of the numerical counts of the two counters is a measure of the duty cycle.

A digital comparator ("comparator") creates an output signal DC1 which reflects the duty cycle. In the simplest form, DC1 is a 1 bit value indicating if the duty cycle of Q is higher or lower than 50%.

Figure 7:
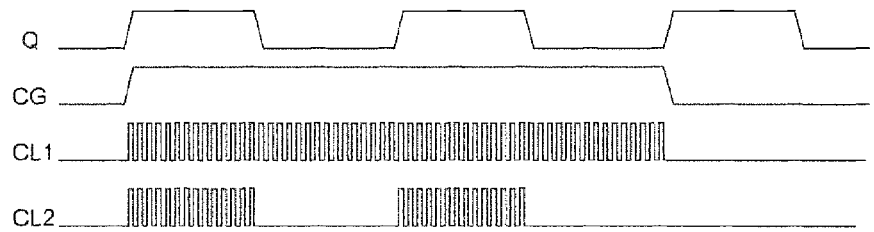
FIG. 7 shows the signals in the duty cycle measurement circuit.

FIG. 7 shows the waveforms arising in FIG. 6.

The input signal Q is divided by 4 by the divider, so that the first high pulse of the signal Q is extended to cover two full cycles of the signal Q. This defines the counting window CG.

The counter1 signal CL1 comprises a series of clock pulses over that complete window.

The counter2 signal CL2 comprises a series of clock pulses only during the two high phases of the two period of signal Q.

Figure 8:
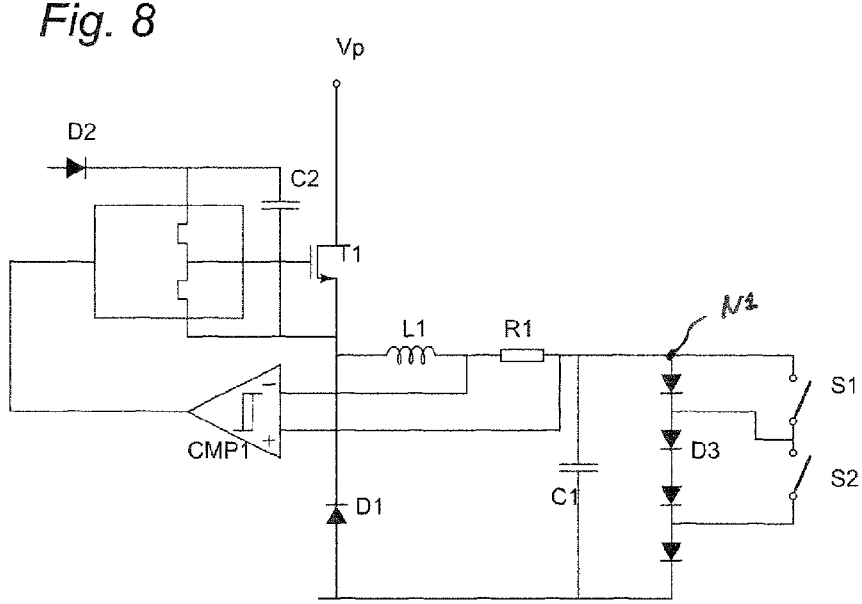
FIG. 8 shows an application diagram for a matrix beam LED system.

FIG. 8 shows a converter circuit similar to as FIG. 1, but now modified for matrix beam dimming. For this purpose, switches S1 and S2
provide short circuit parts around individual LEDs of the string, and they can be controlled with a PWM signal, thereby reducing the light output for some LEDs in the string. This can be used to shape the beam pattern.

There can be shorting switches associated with some or all of the LEDs of the string, and each shorting switch can be associated with a single LED or a group of LEDs.

As a result of the constant current control, the output voltage of the buck converter (at node N1) is lowered when S1 or S2 is switched on. This results in a larger rate of change of current dI/dt for the rising part of the current waveform, for example as shown in FIG. 2, and therefore a larger overshoot (as also shown in FIG. 2). As a result, the average current through the non-shorted LEDs will increase. This is not desirable as it may lead to unpleasant visible artefacts in the light output.

The invention is implemented in the comparator block shown schematically as CMP1.

The invention avoids the need to measure any actual delay values.

The invention essentially provides modification of the trip points of the comparators by changing the reference current I10.

Figure 9:
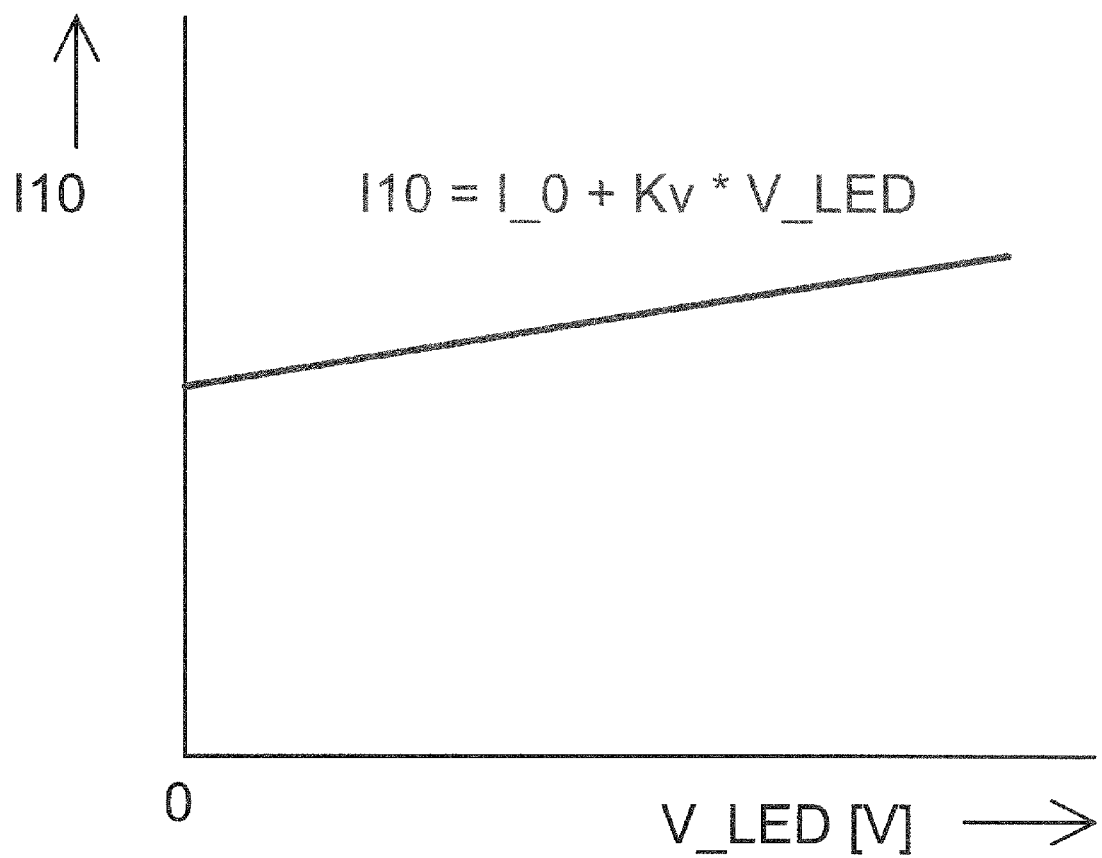
FIG. 9 shows a graph depicting a linear dependence of the current I10 on the output voltage across the LED string.

The current I10 can be linearly dependent on the output voltage across the LED string as shown in FIG. 9.

The invention provides the I_0 and Kv values (which define the linear function) based on an optimisation algorithm that adjusts I_0 and Kv depending on the duty cycle measured by the circuit of FIG. 6.

The LED bypass switches are operated at random with a PWM signal, and the LED current regulation loop has no knowledge of this control. For any given output voltage on node N1 (in FIG. 8), it is possible to regulate to 50% using either small changes in I_0 or small changes in Kv.

Alternatively, both I_0 and Kv can be adjusted to converge to stable settings which give a 50% duty cycle of control signal Q for all changes in the N1 voltage.

For example, this can be by changing only I_0 when the voltage at node N1 (=V_LED in FIG. 9) is close to zero, and only changing Kv when V_LED is at the maximum value. Both parameters can be changed based on interpolation when V_LED is in between these values.

The use of small adjustment steps is basically the function of an integrating (or "I") controller. Depending on the step size, the convergence to the ideal value can be either slow or fast. If the steps are too large, there is the potential for overshoot or instability. It may also be considered to use a PI ("Proportional-Integrating") controller and optimize the controller for fast and accurate control.

Once the I_0 and Kv values have been regulated (possibly slowly) to the final values, the compensation of the delays is instantaneous.

A further option is to add a third counter counter3 to the circuit of FIG. 6 which counts the duty cycle of the gate drive signal (e.g. "Gate" in FIG. 4) in the same way as the duty cycle of control signal Q is measured. This gives a digital representation of the voltage on node N1.

The adjustments are made to provide a duty cycle of 50%. When that condition is reached, the errors caused by the comparator delay and gate driver delay are cancelled. The control loop regulates the median (rather than the average) current, but because the shape of the inductor current is a triangle, this is the same.

The invention essentially provides measurement of the instantaneous voltage at the output, and comparison with a mid-range value. In the example above, this is by comparing the sense resistor voltage with an additional threshold. However, a separate sense resistor can be provided for this purpose, or the voltage measurement can be made in other ways. If a separate sense resistor is provided, the mid-range value of voltage will not necessarily be between the threshold voltages of the main sense resistor; it will be a mid-range value in the sense that the voltage is between the voltages across that separate sense resistor which correspond to the upper and lower threshold currents passing through the LED load.

In the preferred example the mid-range value is the voltage corresponding to a desired current. This means the duty cycle can be controlled to 50%. However, if a different mid-range value is chosen (e.g. 10% down from the upper threshold), the invention can still be implemented, by setting a different desired value of the duty cycle (e.g. 10% above the voltage and 90% below the voltage).

Similarly, the measurement of duty cycle is only one way to derive a measure of the average (or median) voltage level. Other ways of analysing a voltage waveform to derive a measure of the average value will be known to those skilled in the art.

For example, another way to derive the average voltage is to replace the comparator CMP12 of FIG. 4 with an analog integrator using a resistance at the inverting input, and a feedback capacitor between the output Q and the inverting input. The capacitor must be discharged at a fixed time in the cycle (for instance when the Gate signal becomes high). After a full cycle (i.e. the gate has gone low, and then high again) the voltage at the output Q will be a representation of the average current difference to the I_ref*R12 value. Similarly to the median detection, the value at Q (now an analog value) should be regulated to zero, again by small changes of I__0 and Kv as described above.

Thus, the invention essentially comprises the control of the reference current used to set the upper and lower switching thresholds in a way which maintains the average current at a desired level. This enables compensation of the delays which give rise to unequal voltage overshoots.

The control loop that adjusts the reference current is slower than the normal current regulation loop. However, after the calibration has settled, the speed to adapt to changing voltage levels will be instantaneous. In the example shown, a duty factor calculation can be made after two sawtooth ramp profiles (based on the divider function).

The range of suitable divider factors (which dictates how many cycles are counted) is based on the desired resolution for the 50% duty cycle measurement, the gate switching frequency and the frequency of the internal oscillator. Typical values are 0.1% resolution (1000 counts of counter1), and an oscillator frequency of 200 MHz (which implies a minimum measurement time of 5 us for 1000 cycles at 200 MHz). The typical switching frequency is between 100 kHz and 2 MHz (depending on Vp, $V_{N1}$, the inductor value, and the hysteresis window).

A 5 us time window corresponds to 1 to 10 cycles to count as a minimum. However, in practice counting more cycles is preferred, such as 16 or 32.

Typical ranges of the components are Vp=20 to 80V, Hysteresis=50mA to 200 mA, $V_{N1}$=3 to 70V, Inductor=68 to 220 uH.

Only one type of current controller has been outlined above; a buck converter. The invention can be applied to other current controllers, which use a reference current to derive switching values. The invention is of particular interest for hysteretic converters for driving a constant current to the output LED load.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An LED control circuit for controlling a current supplied to an LED unit, the control circuit comprising:
a sense resistor for sensing an output current provided from an output node; and
a comparator circuit for detecting upper and lower thresholds in the output current based on the voltages at each end of the sense resistor, and for controlling a current supply to maintain the current between the thresholds, wherein the comparator circuit comprises a reference current source and reference resistors, for generating upper and lower threshold references,
wherein the comparator circuit further comprises a comparator for detecting a mid-range voltage dependent on the output current and deriving a control signal which indicates if the detected voltage is above or below the mid-range voltage,
and wherein the control signal is used to adjust the reference current source, thereby to vary the upper and lower threshold references to maintain a constant median or average output current.

2. A circuit as claimed in claim 1, wherein the comparator is for detecting a mid-range voltage across the sense resistor.

3. A circuit as claimed in claim 2, wherein the mid-range voltage comprises the voltage across the sense resistor corresponding to a desired average or median output current.

4. A circuit as claimed in claim 1, comprising an inductor in series with the sense resistor to the output node.

5. A circuit as claimed in claim 1, comprising a duty cycle circuit for determining the duty cycle of the control signal.

6. A circuit as claimed in claim 5, wherein the comparator circuit comprises means for adjusting the reference current to maintain the duty cycle at 50%.

7. A circuit as claimed in claim 5, wherein the duty cycle circuit comprises:
a reference clock;
a first counter (counter1) for counting the number of clock cycles during a predetermined number of periods of the control signal;
a second counter (counter2) for counting the number of clock cycles during the high phases with the predetermined number of periods of the control signal; and
a comparator for comparing the counter outputs to derive duty cycle information.

8. A circuit as claimed in claim 7, wherein the duty cycle circuit comprises a divider for dividing the control signal to derive a count window corresponding in length to a multiple of period of the control signal.

9. An LED circuit comprising:
an LED control circuit as claimed in claim 1; and
a string of series-connected LEDs provided at the control circuit output.

10. A circuit as claimed in claim 9, wherein the string of LEDs comprises at least one bypass switch in parallel with a sub-set of one more LEDs of the strings, thereby to provide controllable dimming of the sub-set of LEDs.

11. A method of controlling the current supplied to an LED unit, the method comprising:
sensing an output current provided to the LED unit;
detecting upper and lower thresholds in the output current by comparing the voltages at each end of a sense resistor with upper and lower threshold references which are generated using a reference current;
controlling a current supply to maintain the current between the thresholds,
wherein the method further comprises:
detecting a mid-range voltage dependent on the output current and deriving a control signal which indicates if the detected voltage is above or below the mid-range voltage; and
adjusting the reference current source to vary the upper and lower threshold references to maintain a constant median or average output current.

12. A method as claimed in claim 11, wherein the mid-range voltage is detected across the sense resistor and comprises the voltage across the sense resistor corresponding to a desired average or median output current.

13. A method as claimed in claim 11, comprising determining the duty cycle of the control signal.

14. A method as claimed in claim 13, comprising adjusting the reference current to maintain the duty cycle at 50%.

15. A method as claimed in claim 11, comprising deriving a calibration function from the reference current source adjustments, such that the calibration function determines a required relationship between the control signal and the required reference current source setting.

* * * * *